No. 652,240. Patented June 26, 1900.
J. A. BONFIGLIO.
HAND FAN.
(Application filed Aug. 13, 1898.)
(No Model.)
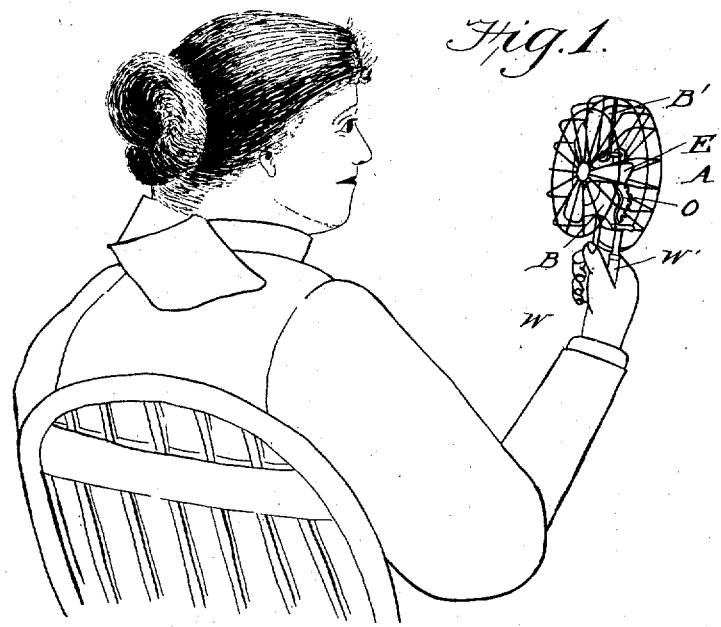
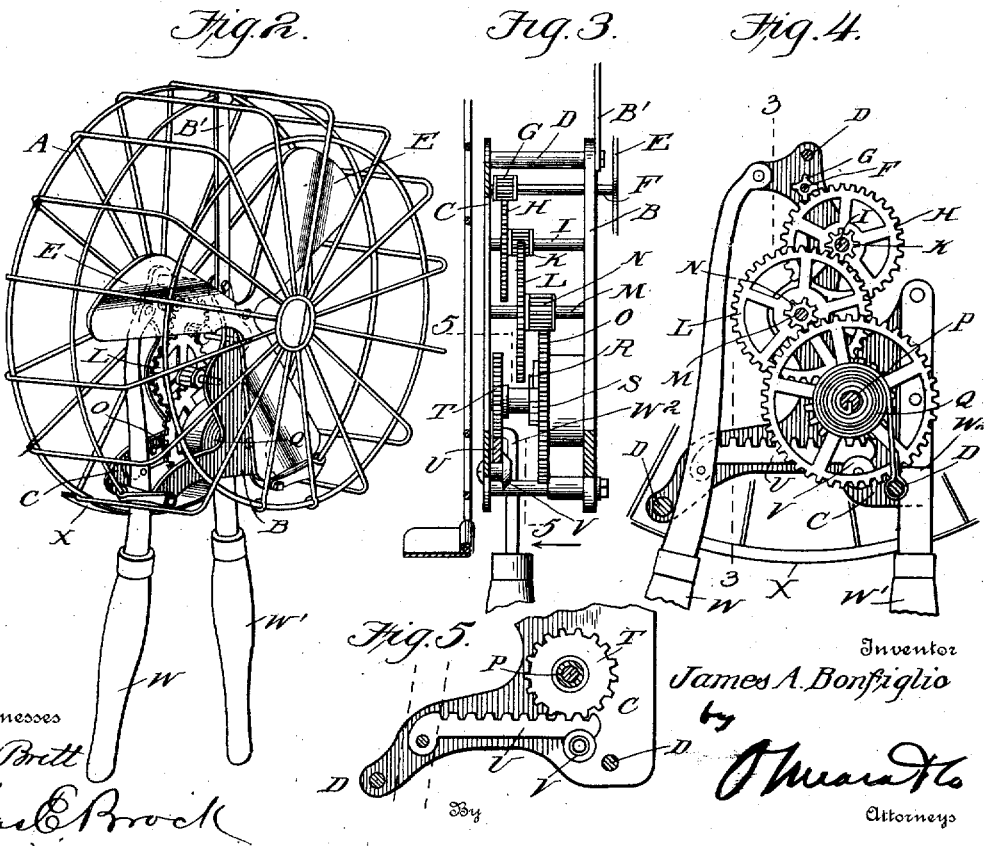

UNITED STATES PATENT OFFICE.

JAMES ALBANY BONFIGLIO, OF NEW ORLEANS, LOUISIANA, ASSIGNOR TO VINCENT GRAY, OF SAME PLACE.

HAND-FAN.

SPECIFICATION forming part of Letters Patent No. 652,240, dated June 26, 1900.

Application filed August 13, 1898. Serial No. 688,498. (No model.)

*To all whom it may concern:*

Be it known that I, JAMES ALBANY BONFIGLIO, a citizen of the United States, residing at New Orleans, in the parish of Orleans and State of Louisiana, have invented a new and useful Hand-Fan, of which the following is a specification.

This invention relates generally to fans, and more particularly to a spring-power rotary fan, the object being to provide a fan of this kind in which the spring is wound through the medium of a hand-pressed lever and whereby the fan can be held in one hand and rapidly rotated by simply pressing upon said operating-lever.

The invention consists, essentially, of a rotary fan mounted within a suitable cage and having its shaft rotated by the train of gearing, spring-impelled, the power of said spring being secured by winding about a shaft, which is rotated through the medium of a ratchet and pawl, rack and pinion, and hand-lever, to which said rack is attached.

The invention also consists in certain details of construction and novelties of combination, all of which will be fully described hereinafter and pointed out in the claims.

In the drawings forming a part of this specification, Figure 1 is a view showing the practical application of my invention. Fig. 2 is a detail perspective view of the fan complete. Fig. 3 is a section on the line 3 3 of Fig. 4. Fig. 4 is a detail view of the operating mechanism, and Fig. 5 is a detail view taken on the line 5 5 of Fig. 3.

In carrying out my invention I employ a suitable cage A, constructed of light wire similar to the ordinary cages employed to protect rotary fans. A bearing-plate B is arranged within the cage, near the bottom of the same, and supported therein through the medium of hangers B', and rigidly connected to the bearing-plate B is a second bearing-plate C, which is arranged parallel to the plate B and connected therewith through the medium of the posts D.

The fan E is composed of a series of twisted blades or wings and is mounted upon the end of a shaft F, journaled in the bearing-plates B and C, said shaft also carrying a lantern-pinion G, with which meshes a gear H, mounted upon the shaft I, which also carries a pinion K, with which meshes a gear L, mounted upon a shaft M, also carrying a pinion N, which in turn is engaged by a gear O, loosely mounted upon the shaft P, to which is connected one end of the spring Q, the opposite end of the spring being connected to one of the posts D, connecting the bearing-plates.

The gear O carries a spring-pawl R, which engages a ratchet-wheel S, mounted rigidly upon the shaft P, and a pinion T is also rigidly attached to said shaft and with which a rack-bar U engages, said bar being held in contact with the pinion by means of a guide roller or collar V. The rack-bar U is pivotally attached to a hand-lever W, the upper end of said lever being pivoted to the bearing-plate C, near the upper end, and another handle member W' is rigidly attached to the opposite side of the said bearing-plate and has an offset $W^2$ to permit the rack-bar to pass beneath the same.

A guard or rest plate X is rigidly attached to the bottom of the frame at the rear side in order to insure the operator holding the fan in the proper position, the said guard or rest plate being adapted to rest upon the upper portion of the forefinger.

In order to operate the fan, the handles W and W' are held in the hand, the handle W' resting in the palm, while the forefingers are closed around the handle W, and by pressing upon said handle the rack-bar U is forced inwardly, thereby operating the pinion T, which in turn revolves the shaft P and winds up the spring and sets the train of gearing in motion, thereby rotating the fan, and as the gearing is connected with the shaft through the medium of the pawl and ratchet it will of course be understood that the fan will continue to rotate while the handle W is being worked back and forth to wind the spring, said spring being normally held nearly wound, so that one operation of the handle W is sufficient to start the rotation of the fan rapidly, and this rotation can be continued by intermittently pressing upon the handle W.

In assembling the parts of the fan for use the spring Q is partially wound up before the rack U is put in engagement with pinion T, which is connected directly therewith. In this manner the spring can only unwind to such an extent as to carry the rack outward to the extent of its movement, which is determined by the handle member W coming in engagement with the post or cross-bar D. This will cause the inward movement of the handles, however slow or uneven, to wind up the spring without operating the fan. When, however, the handles have reached the limit or any portion of their inward movement and are released, the spring will instantly expand with a strong and uniform pressure, which will be applied to the fan through the ratchet mechanism and the train of gearing and will also quickly carry the handles outward through the engagement of the pinion T with the rack-bar U. By this construction the fan will be started quickly and driven rapidly, so that its momentum after the spring has ceased to operate will cause it to rotate for quite a length of time after the handles have been returned to their normal outward position ready for a succeeding compression.

It will thus be seen that I provide an exceedingly cheap, simple, and efficient construction of a spring-power rotary fan in which the spring-operating mechanism can be set in motion by simply pressing upon a lever, which also forms one of the handles of the fan.

Having thus described my invention, what I claim as new, and desire to secure by Letters Patent of the United States, is—

1. In a hand-fan, the combination, with two relatively-movable handles of a fan journaled at the upper end of one of them, a spring-actuated train of gearing for operating the fan, and means upon and operated by the other handle for winding the spring, substantially as described.

2. In a hand-fan, the combination, with two relatively-movable handles of a fan journaled at the upper end of one of them, a spring-actuated train of gearing for operating the fan, and means for connecting the other handle with the spring so as to cause said handles to move in both directions in unison, substantially as described.

3. In a hand-fan, the combination, with two relatively-movable handles of a fan journaled at the upper end of one of them, a spring-actuated train of gearing for operating the fan, a pinion connected with the spring, and a rack on the other handle in engagement with the pinion, substantially as described.

4. In a hand-fan, the combination, with two relatively-movable handles one of which is provided with a frame and the other one is pivotally secured to the frame, of a fan journaled in the frame, a spring-actuated train of gearing in the frame for operating the fan, and means upon the pivoted handle for winding the spring, substantially as described.

5. In a hand-fan, the combination, with two relatively-movable handles, one of which is provided with a frame while the other one is pivotally secured to the frame, and so located that its intermediate portion is adapted to engage with one of the posts of the frame and limit its outward movement, of a fan journaled in the frame, a spring-actuated train of gearing for operating the fan, a pinion connected with the spring, and a rack connected with the pivoted handle and in engagement with the pinion, substantially as described.

JAMES ALBANY BONFIGLIO.

Witnesses:
F. HIRSCHWITZ,
CHAS. K. LEVY.